United States Patent
Wantland et al.

(10) Patent No.: US 10,008,021 B2
(45) Date of Patent: Jun. 26, 2018

(54) PARALLAX COMPENSATION

(75) Inventors: Timothy Wantland, Bellevue, WA (US); Gonzalo Alberto Ramos, Kirkland, WA (US); Donald Barnett, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 493 days.

(21) Appl. No.: 13/325,430
(22) Filed: Dec. 14, 2011
(65) Prior Publication Data
US 2013/0155180 A1  Jun. 20, 2013

(51) Int. Cl.
*H04N 7/00* (2011.01)
*H04N 5/225* (2006.01)
(Continued)

(52) U.S. Cl.
CPC ......... *G06T 13/80* (2013.01); *G01S 3/7865* (2013.01); *G06T 7/73* (2017.01); *H04N 5/23238* (2013.01); *H04N 13/0239* (2013.01)

(58) Field of Classification Search
CPC .......... H04N 7/00; H04N 5/14; H04N 13/00; H04N 13/04; H04N 7/188; H04N 13/0055; H04N 5/2628; H04N 5/272; H04N 5/23238; G06F 3/048; G06T 15/00; G06T 7/0042; G06T 13/80
(Continued)

(56) References Cited

U.S. PATENT DOCUMENTS 5,138,460 A * 8/1992 Egawa ................ G03B 37/04
348/239

5,473,364 A * 12/1995 Burt ................ G08B 13/19602
348/144

(Continued)

FOREIGN PATENT DOCUMENTS

CN  1567385 A  1/2005
CN  1641702 A  7/2005
(Continued)

OTHER PUBLICATIONS

Non-Final Office Action cited in U.S. Appl. No. 13/325,466 dated Nov. 7, 2013, 14 pgs.
(Continued)

*Primary Examiner* — Thai Tran
*Assistant Examiner* — Syed Hasan

(57) ABSTRACT

Among other things, one or more techniques and/or systems are disclosed for rendering imagery that compensates for parallax. Image data may comprise a sequence of images of a location, collected at known intervals (e.g., distances), such as along a path. The image data can comprise a first layer comprising a first depth, and a second layer comprising a second depth, that is different from the first depth. The image data can be composed into resulting imagery, where the first layer is composed at the first depth and the second layer is composed at the second depth. The resulting imagery can be rendered to compensate for, or rather make use of, parallax, such that the first layer is rendered at a first movement speed, based at least upon the first depth, and the second layer is rendered at a second movement speed, based at least upon the second depth.

20 Claims, 9 Drawing Sheets

(51) Int. Cl.
*H04N 13/00* (2018.01)
*G06K 9/00* (2006.01)
*G06T 15/00* (2011.01)
*G06T 13/80* (2011.01)
*G01S 3/786* (2006.01)
*G06T 7/73* (2017.01)
*H04N 13/02* (2006.01)
*H04N 5/232* (2006.01)

(58) Field of Classification Search
USPC ... 348/36, 26, 42, 56, 154, E7.001, 51, 142,
348/744, E7.085, E9.025, E13.001, 47,
348/155, 169, 239, 333.12; 345/419,
345/629; 715/786, 854; 382/106, 195
See application file for complete search history.

(56) References Cited

U.S. PATENT DOCUMENTS

| | | | |
|---|---|---|---|
| 5,973,726 | A | 10/1999 | Iijima et al. |
| 6,064,399 | A | 5/2000 | Teo |
| 6,075,905 | A | 6/2000 | Herman et al. |
| 6,205,253 | B1 | 3/2001 | King |
| 6,415,227 | B1 | 7/2002 | Lin |
| 6,665,003 | B1 | 12/2003 | Peleg et al. |
| 7,002,578 | B1 | 2/2006 | Ritter |
| 7,110,592 | B2 | 9/2006 | Kotake |
| 7,298,548 | B2 | 11/2007 | Mian |
| 7,499,586 | B2 | 3/2009 | Argawala |
| 7,558,432 | B2 | 7/2009 | Zaharia et al. |
| 7,580,076 | B2 | 8/2009 | Battles et al. |
| 7,760,269 | B2 | 7/2010 | Ochs et al. |
| 7,840,032 | B2 | 11/2010 | Ofek |
| 7,899,270 | B2 | 3/2011 | Kim et al. |
| 8,174,562 | B2 * | 5/2012 | Hartman ............ H04N 13/0217 348/26 |
| 8,269,822 | B2 * | 9/2012 | Zalewski ................ A63F 13/00 348/56 |
| 8,315,791 | B2 | 11/2012 | Bales |
| 8,368,720 | B2 | 2/2013 | Peterson |
| 8,610,741 | B2 | 12/2013 | Szeliski et al. |
| 8,868,336 | B2 | 10/2014 | Suzuno |
| 8,913,083 | B1 | 12/2014 | Ogale |
| 8,995,788 | B2 | 3/2015 | Williams et al. |
| 2001/0038718 | A1 | 11/2001 | Kumar et al. |
| 2002/0154812 | A1 | 10/2002 | Chen et al. |
| 2002/0167533 | A1 * | 11/2002 | Tirumalai ................ A61B 8/14 345/629 |
| 2002/0176635 | A1 | 11/2002 | Aliaga et al. |
| 2002/0196188 | A1 | 12/2002 | Holt |
| 2003/0169286 | A1 | 9/2003 | Misawa |
| 2005/0128196 | A1 | 6/2005 | Popescu et al. |
| 2005/0192924 | A1 | 9/2005 | Drucker et al. |
| 2006/0115181 | A1 | 6/2006 | Deng et al. |
| 2006/0120625 | A1 | 6/2006 | Peleg et al. |
| 2006/0214953 | A1 | 9/2006 | Crew et al. |
| 2007/0076920 | A1 | 4/2007 | Ofek |
| 2007/0103544 | A1 | 5/2007 | Nakazawa |
| 2007/0122058 | A1 | 5/2007 | Kitaura |
| 2007/0204014 | A1 | 8/2007 | Greer et al. |
| 2008/0043020 | A1 | 2/2008 | Snow et al. |
| 2008/0051997 | A1 | 2/2008 | Rosenberg |
| 2008/0066000 | A1 | 3/2008 | Ofek |
| 2008/0140309 | A1 | 6/2008 | Jendbro |
| 2008/0170804 | A1 | 7/2008 | Zhang et al. |
| 2008/0268876 | A1 | 10/2008 | Gelfand et al. |
| 2008/0291201 | A1 | 11/2008 | LaFon |
| 2008/0291217 | A1 | 11/2008 | Vincent et al. |
| 2008/0309668 | A1 | 12/2008 | Borovikov |
| 2009/0021576 | A1 | 1/2009 | Linder et al. |
| 2009/0031246 | A1 * | 1/2009 | Cowtan ................ G06Q 50/16 715/786 |
| 2009/0079730 | A1 | 3/2009 | Lee et al. |
| 2009/0116764 | A1 | 5/2009 | Liu |
| 2009/0208062 | A1 | 8/2009 | Sorek et al. |
| 2009/0240431 | A1 | 9/2009 | Chau et al. |
| 2010/0014436 | A1 | 1/2010 | Talagery |
| 2010/0014780 | A1 | 1/2010 | Kalayeh |
| 2010/0033553 | A1 | 2/2010 | Levy |
| 2010/0110069 | A1 * | 5/2010 | Yuan ................ G06T 15/20 345/419 |
| 2010/0118116 | A1 | 5/2010 | Tomasz et al. |
| 2010/0123737 | A1 | 5/2010 | Williamson |
| 2010/0146436 | A1 | 6/2010 | Jakobson et al. |
| 2010/0157018 | A1 * | 6/2010 | Lampotang ............ G06F 3/011 348/36 |
| 2010/0194851 | A1 | 8/2010 | Pasupaleti et al. |
| 2010/0201682 | A1 | 8/2010 | Quan |
| 2010/0215250 | A1 | 8/2010 | Zhu |
| 2010/0220893 | A1 | 9/2010 | Lee |
| 2010/0251101 | A1 | 9/2010 | Haussecker et al. |
| 2010/0259610 | A1 * | 10/2010 | Petersen ................ G06Q 30/02 348/142 |
| 2010/0302280 | A1 | 12/2010 | Szeliski et al. |
| 2010/0309293 | A1 * | 12/2010 | Plut ...................... H04N 9/3147 348/51 |
| 2011/0010650 | A1 | 1/2011 | Hess et al. |
| 2011/0018902 | A1 | 1/2011 | Ofek |
| 2011/0043604 | A1 | 2/2011 | Peleg et al. |
| 2011/0085027 | A1 | 4/2011 | Yamashita |
| 2011/0096957 | A1 | 4/2011 | Anai et al. |
| 2011/0123120 | A1 | 5/2011 | Quack |
| 2011/0141141 | A1 | 6/2011 | Kankainen |
| 2011/0141229 | A1 | 6/2011 | Stec et al. |
| 2011/0158509 | A1 | 6/2011 | Li et al. |
| 2011/0158528 | A1 | 6/2011 | Yea et al. |
| 2011/0211040 | A1 | 9/2011 | Lindemann et al. |
| 2011/0265023 | A1 | 10/2011 | Loomis et al. |
| 2011/0279445 | A1 | 11/2011 | Murphy et al. |
| 2011/0279446 | A1 | 11/2011 | Castro et al. |
| 2011/0302527 | A1 | 12/2011 | Chen et al. |
| 2011/0304699 | A1 * | 12/2011 | Ito ........................ A63F 13/10 348/47 |
| 2012/0036433 | A1 | 2/2012 | Zimmer et al. |
| 2012/0127158 | A1 * | 5/2012 | Miyagi ................ G06T 15/20 345/419 |
| 2012/0133639 | A1 | 5/2012 | Kopf et al. |
| 2012/0293608 | A1 * | 11/2012 | Doepke .............. H04N 5/23238 348/36 |
| 2012/0294549 | A1 | 11/2012 | Doepke |
| 2013/0106990 | A1 | 5/2013 | Williams et al. |
| 2013/0155047 | A1 | 6/2013 | Williams et al. |
| 2013/0155181 | A1 | 6/2013 | Williams et al. |
| 2013/0156326 | A1 | 6/2013 | Williams et al. |
| 2013/0242041 | A1 | 9/2013 | Hollinger |
| 2013/0249812 | A1 | 9/2013 | Ramos et al. |
| 2014/0002588 | A1 | 1/2014 | Ahiska |
| 2015/0116360 | A1 | 4/2015 | Jones et al. |
| 2015/0249768 | A1 | 9/2015 | Toshima |
| 2015/0249786 | A1 | 9/2015 | Williams et al. |
| 2016/0307299 | A1 | 10/2016 | Williams et al. |

FOREIGN PATENT DOCUMENTS

| | | |
|---|---|---|
| CN | 1845094 | 10/2006 |
| CN | 101251958 A | 8/2008 |
| CN | 101666656 | 3/2010 |
| CN | 101841727 | 9/2010 |
| CN | 101852620 | 10/2010 |
| CN | 101923709 A | 12/2010 |

OTHER PUBLICATIONS

Reply Non-Final Office Action cited in U.S. Appl. No. 13/325,466 dated Feb. 7, 2014, 11 pgs.
Int. Search Report cited in PCT Application No. PCT/US2012/067813 dated Mar. 22, 2013, 9 pgs.
"Layered Depth Images", Jonathan Shade, Steven J. Gortier, Li-Wei He and Richard Szeliski, Jul. 19-24, 1998, In Proceedings of the 25th Annual Conference on Computer Graphics and Interactive

(56) References Cited

OTHER PUBLICATIONS

Techniques (SIGGRAPH 1998), Orlando, Florida, ed. SIGGRAPH and Michael Cohen, 13 pgs.
"International Search Report", dated Mar. 26, 2013, Application No. PCT/US2012/069951, Filed date: Dec. 14, 2012, pp. 9.
Brown, et al., "Automatic Panoramic Image Stitching using Invariant Features", Retrieved at <<http://mesh.brown.edu/engn1610/pdfs/Brown-ijcv2007.pdf>>, International Journal of Computer Vision, vol. 47, No. 1, 2007, pp. 59-73.
Levin, et al., "Seamless Image Stitching in the Gradient Domain", Retrieved at <<http://cs.engr.uky.edu/~jacobs/classes/2010_photo/readings/gradient_domain_stitching.pdf>>, Eighth European Conference on Computer Vision (ECCV), 2004, pp. 12.
Xiao; et al., "Image-based street-side city modeling", Published Dec. 2009, Proceedings: ACM SIGGRAPH Asia 2009, http://md1.csa.com/partners/viewrecord.php?requester=gs&collection=TRD&recid=201006340377341Cl&q=&uid=788264198&setcookie=yes.
Xiao; et al., "Image-based Facade Modeling", Published Dec. 2008, Proceedings: ACM Transactions on Graphics (TOG) Proceedings of SIGGRAPH Asia 2008, http://web.mit.edu/jxiao/Public/publication/2008/TOG_facade/paper_low-res.pdf.
Micusk; et al., "Piecewise Planar City 3D Modeling from Street View Panoramic Sequences", Published Jun. 25, 2009, Proceedings: IEEE Conference on Computer Vision and Pattern Recognition, 2009 (CVPR 2009), pp. 2906-2912, pp. 2906-2912, http://ieeexplore.ieee.org/stamp/stamp.jsp?tp=&arnumber=5206535.
Kopf; et al., "Street Slide: Browsing Street Level Imagery", Retrieved Oct. 21, 2011, http://research.microsoft.com/en-us/um/people/cohen/street_slide.pdf.
U.S. Appl. No. 13/325,466, Office Action dated Sep. 10, 2015, 6 pgs.
Final Office Action cited in U.S. Appl. No. 13/325,466 dated Apr. 24, 2014, 15 pgs.
Reply Final Office Action cited in U.S. Appl. No. 13/325,466 dated Oct. 24, 2014, 12 pgs.
Non-Final Office Action cited in U.S. Appl. No. 13/325,466 dated Dec. 4, 2014, 16 pgs.
Int. Preliminary Report cited in PCT Application No. PCT/US2013/069951 dated Jun. 17, 2014, 5 pgs.
First Chinese Office Action cited in Chinese Application No. 201210540807.5 dated May 16, 2014, 6 pgs.
Reply first Chinese Office Action cited in Chinese Application No. 201210540807.5 dated Sep. 28, 2014, 6 pgs.
Second Chinese Office Action cited in Chinese Application No. 201210540807.5 dated Jan. 6, 2015, 3 pgs.
First Chinese Office Action cited in Chinese Application No. 201210540664.8 dated Oct. 10, 2014, 5 pgs.
U.S. Appl. No. 13/325,652, Amendment and Response filed May 22, 2015, 14 pgs.
U.S. Appl. No. 13/325,652, Amendment and Response filed Sep. 25, 2014, 12 pgs.
U.S. Appl. No. 13/325,652, Office Action dated Dec. 22, 2014, 12 pgs.
U.S. Appl. No. 13/325,652, Office Action dated Mar. 25, 2014, 10 pgs.
Sibiryakov, Alexander, "Photo collection representation based on viewpoint clustering"—Published Date: Nov. 28, 2007, Proceedings: Electronic Imaging and Multimedia Technology, http://citeseerx.ist.psu.edu/viewdoc/download?doi=10.1.1.148.8701&rep=rep1&type=pdf.
Kopf, et al., "Street Slide: Browsing Street Level Imagery"—Published Date: Jun. 20-25, 2009, Proceedings: Computer Vision and Pattern Recognition, 2009. CVPR 2009, IEEE Conference, http://research.microsoft.com/en-us/um/people/cohen/street_slide.pdf.
Kroepfl, et al., "Efficiently Locating Photographs in Many Panoramas"—Published Date: 2010, Proceedings: 18th SIGSPATIAL International Conference on Advances in Geographic Information Systems, http://research.microsoft.com/en-us/um/people/cohen/street_slide.pdf.
Chinese First Office Action cited in Chinese Application No. 201210541675.8 dated Feb. 16, 2015, 3 pgs.
PCT Int. Search Report cited in PCT Application No. PCT/US2012/069954 dated Apr. 29, 2013, 12 pgs.
PCT Int. Preliminary Report cited in PCT Application No. PCT/US2012/069954 dated Jun. 17, 2014, 6 pgs.
Chinese Second Office Action Issued in Patent Application No. 201210541675.8, dated Oct. 19, 2015, 12 Pages.
U.S. Appl. No. 13/325,612, Office Action dated May 15, 2014, 13 pgs.
U.S. Appl. No. 13/325,612, Amendment and Response filed Nov. 17, 2014, 10 pgs.
U.S. Appl. No. 13/325,612, Notice of Allowance dated Dec. 1, 2014, 7 pgs.
Yining Deng et al., "Generating Panorama Photos", Proceedings of SPIE vol. 5242 Internet Multimedia Management Systems IV, (SPIE, Bellingham, WA, 2003), pp. 270-279.
Zheng, Jiang Yu, "Stabilizing Route Panoramas"—Published Date: Aug. 23-26, 2004, Proceedings: 17th International Conference on Pattern Recognition, vol. 1, http://www.cs.iupui.edu/.about.jzheng/deshaking.pdf.
U.S. Appl. No. 13/325,466, Amendment and Response filed Dec. 9, 2015, 9 pgs.
U.S. Appl. No. 13/325,466, Notice of Allowance dated Jan. 13, 2016, 7 pgs.
Chinese Notice of Allowance in Application 201210540664.8, dated Jan. 8, 2016, 4 pgs.
"Navigation System for Virtual Reality Visualization of Large-Scale Datasets", http://www.urop.uci.edu/SURP/sample_proposals/SURP%20Engineering%205.pdf.
Chinese Notice of Allowance in Patent Application No. 201210541675.8, dated Apr. 13, 2016, 3 pgs.
Gonzalez, Nick, "Google Maps Now with 360 Streetside Views", May 29, 2007, pp. 1-3, http://www.techcrunch.com/2007/05/29/google-maps-now-with-360-streetside-views/.
U.S. Appl. No. 12/476,810, Amendment and Response filed Apr. 16, 2013, 13 pgs.
U.S. Appl. No. 12/476,810, Amendment and Response filed Sep. 24, 2012, 10 pgs.
U.S. Appl. No. 12/476,810, Notice of Allowance dated Aug. 13, 2013, 7 pgs.
U.S. Appl. No. 12/476,810, Office Action dated Jan. 17, 2013, 13 pgs.
U.S. Appl. No. 12/746,810, Office Action dated Jun. 22, 2012, 26 pgs.
U.S. Appl. No. 13/325,652, Notice of Allowance dated Mar. 28, 2016, 7 pgs.
Agarwala, Aseem, "Photographing long scenes with multi-viewpoint panoramas", Published Date: 2006, http://vis.berkeley.edu/papers/longScenes/LongThings.pdf, 9 pgs.
Chinese Notice of Allowance in Application 201210540807.5, dated Mar. 2, 2015, 6 pgs.
Chinese 2nd Office Action cited in Chinese Application No. 201210540664.8, dated Jun. 12, 2015, 9 pgs.
Fleck, et al., "Graph Cut based Panoramic 3D Modeling and Ground Truth Comparison with a Mobile Platform—The Wagele", Retrieved at <<http://ieeexplore.ieee.org/stamp/stamp.jsp?tp=&arnumber=1640374>>, The 3rd Canadian Conference on Computer and Robot Vision, Jun. 7-9, 2006, pp. 10.
http://www.superhighstreet.com, front page, About Us page, and Help & FAQ pages, 6 pages, Feb. 12, 2008.
Kopf et al., "Street Slide: Browsing Street Level Imagery", Published Date: 2010, http://research.microsoft.com/pubs/121744/Kopf-sg10.pdf, 8 pgs.
Pollefeys, M., "Detailed Real-Time Urban 3D Reconstruction from Video—Springer," Detailed Real-Time Urban 3D Reconstruction from Video—Springer. Oct. 20, 2007, Oct. 20, 2007. Web. Apr. 21, 2014.

(56) References Cited

OTHER PUBLICATIONS

Rav-Acha et al., "Minimal Aspect Distortion (MAD) Mosaicing of Long Scenes", International Journal of Computer Vision, vol. 28, Issue 2-3, Jul. 2008, pp. 187-206.
Roman et al., "Automatic Multiperspective Images", Proceedings of the 17th Eurographics Conference on Rendering Techniques, 2006.
Simonite, Technology Review, "A Smoother Street View", Published Date: Jul. 28, 2010, http://www.technologyreview.in/web/25880/, 4 pgs.
Szeliski, Richard, "Image Alignment and Stitching: A Tutorial", Published Date: Dec. 10, 2006, http://research.microsoft.com/pubs/70092/tr-2004-92.pdf, 89 pgs.
U.S. Appl. No. 12/957,124, Amendment and Response filed Oct. 29, 2013, 15 pgs.
U.S. Appl. No. 12/957,124, Amendment and Response filed Jun. 10, 2014, 13 pgs.
U.S. Appl. No. 12/957,124, Amendment and Response filed Jul. 19, 2013, 14 pgs.
U.S. Appl. No. 12/957,124, Notice of Allowance dated Jul. 22, 2014, 8 pgs.
U.S. Appl. No. 12/957,124, Office Action dated Mar. 10, 2014, 17 pgs.
U.S. Appl. No. 12/957,124, Office Action dated Apr. 22, 2013, 22 pgs.
U.S. Appl. No. 12/957,124, Office Action dated Jul. 31, 2013, 25 pgs.
U.S. Appl. No. 13/286,756, Amendment and Response filed Oct. 3, 2014, 12 pgs.
U.S. Appl. No. 13/286,756, Office Act ion dated Nov. 18, 2014, 18 pgs.
U.S. Appl. No. 13/286,756, Office Act ion dated Apr. 3, 2014, 19 pgs.
U.S. Appl. No. 13/325,466, Ammendment and Response filed May 4, 2015, 13 pgs.
Svennerberg, Gabriel, "Beginning Google Maps API 3", Apress Publishers, 2nd Edition, Jul. 27, 2010, pp. 73-79 and 181-192.
U.S. Appl. No. 14/714,768, Office Action dated Aug. 25, 2017, 12 pages.
U.S. Appl. No. 14/714,768, Amendment and Response filed Jan. 22, 2018, 11 pages.
U.S. Appl. No. 15/195,470, Office Action dated Feb. 5, 2018, 12 pages.
U.S. Appl. No. 14/714,768, Notice of Allowance dated Mar. 29, 2018, 10 pages.

* cited by examiner

PARALLAX COMPENSATION

BACKGROUND

Digital photography can allow for a sequence of images to be stitched or glued together to provide for a relatively seamless transition from one image to the next. Further, images, such as side-view images, can be collected while traveling along a route, such as a street. Stitching these side-view images together can provide a user experience of travelling along the route, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A side or lateral-view of panoramic imagery may comprise a series of images (e.g., photo frames, video frames, etc.) stitched/glued together to form a somewhat seamless view of the imagery. This type of planar panorama imagery typically displays many of the stitched together images at a same time. Currently, images stitched together in this manner can be utilized in conjunction with digital mapping services, where, for example, a user may view planar panorama-type images of a street associated with a map they may be viewing.

When moving laterally along planar panorama imagery a user might see different perspectives of objects in the panorama and/or objects in the images may be altered due to different viewing angles from which the different images were acquired, for example. Different viewing angles of a same object in the imagery may be a result of parallax, an effect caused by viewing a same object from different locations, thereby providing different lines of sight to the object. When adjacent images are stitched together, conventional techniques may not account for parallax such that a user may have a less than natural experience when moving laterally (e.g., panning) resulting panoramic imagery.

Accordingly, among other things, one or more techniques and/or systems are disclosed to compensate for parallax to provide for improved stitching, merging, etc. of images into a planar panorama, for example, by decomposing imagery into different layers. The resulting imagery may utilize parallax, for example, allowing for a more natural viewing experience of objects and/or data tags, etc. at different depths. The parallax effect may be compensated for by distinguishing layers in the imagery, and rendering the different layers at different movement speeds, for example, when panning laterally along the lateral panorama. As an example, objects in the foreground of the imagery may be comprised in a layer that moves faster than objects in a background layer. Accordingly, objects, data tags, etc. may (at least appear to) obey similar rules of parallax.

In one embodiment of rendering imagery that compensates for parallax, image data can be received, where the image data comprises a first layer, comprising a first depth, and the image data comprises a second layer, comprising a second depth. Further, the first layer can be composed at the first depth in resulting imagery and the second layer can be composed at the second depth in the resulting imagery. Additionally, the resulting imagery can be rendered to compensate for parallax. To compensate for parallax, the first layer can be rendered at a first movement speed and the second layer can be rendered at a second movement speed. The first movement speed and the second movement speed may be based at least upon the first depth and the second depth.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
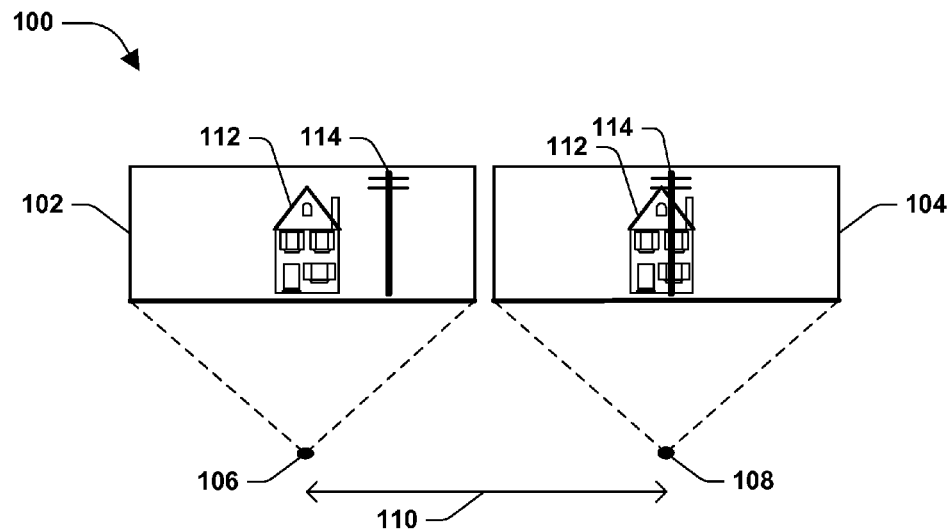
FIGS. 1A and 1B illustrate an example of parallax.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1B:
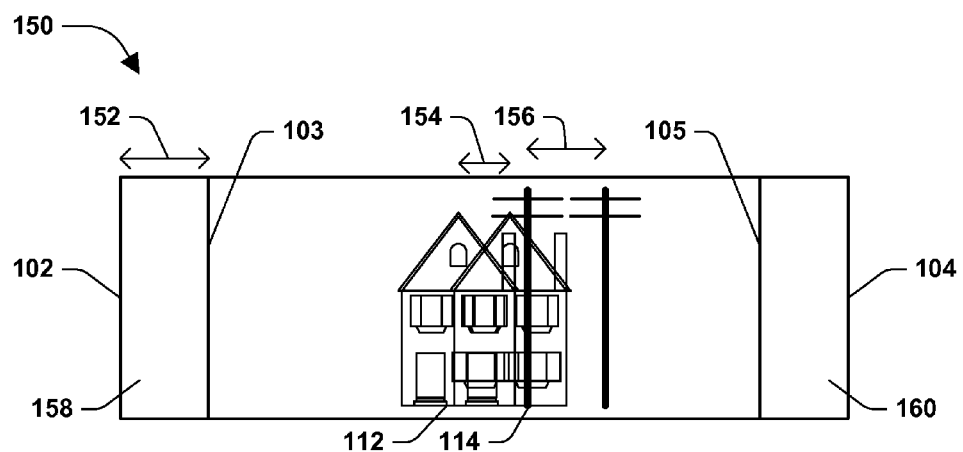

Parallax is a perceived change in position and/or direction of an object that may be a result of a change in an observer position relative to the object. When the observer changes their observational position, a line of sight to the object may also be changed. As an illustrative example, FIGS. 1A and 1B illustrate example embodiments 100, 150 where parallax may be identified. In the example embodiment 100, a first image 102 comprises a first object 112 (a building) and a second object 114 (a utility pole). The first image 102 may be a result of a first observational position 106 (e.g., where an observer is positioned and/or a position where an image capture device captures the image). Further, in the example embodiment 100, a second image 104 also comprises the first object 112 and the second object 114; however, the second object 114 appears to be positioned in front of the first object 112. The second image 104 may be a result of a second observational position 108. Additionally, the second observational position 108 is disposed at a different position, a particular distance 110 away from the first observational position 106.

As an example, the utility pole 114 may be disposed closer to the observational positions 106, 108 than the building 112 (is to the observational positions 106, 108). In this example, if the distance between the respective objects 112, 114 and the observational positions 106, 108 is maintained when the observer moves from the first position 106 to the second position 108 (and/or from 108 to 106), the utility pole 114 may appear to move laterally at a different rate than the building 112. This perceived movement rate difference (e.g., from the observers perspective) of the objects 112, 114 is a result of parallax, where the line of site angle for a closer object (e.g., 114) changes at a different rate than that of the more distant object (e.g., 112). Therefore, in this example, when the observer moves the particular distance 110 laterally the utility pole 114 may appear in front of the building 112, as the observer's line of sight angle to the respective objects 112, 114 has also changed, but at different rates (e.g., the line of site angle for the building 112 changed from eighty-five degrees to ninety degrees, while the line of site angle for the utility pole 114 changed (e.g., faster, more drastically, etc.) from sixty degrees to eighty-five degrees, for example).

In the example embodiment 150, the respective images 102, 104 are overlaid, offset 152 by a same relative distance as the particular distance 110 between the observational positions 106, 108. That is, for example, the respective images 102, 104 may comprise much of the same image data (e.g., captured image objects); however, the first image 102 may include additional image data 158 comprised by the offset 152 to the left of a boundary 103 of the second image 104, and the second image 104 may include additional image data 160 comprised by the offset 152 to the right of a boundary 105 of the first image 102.

Further, in this example embodiment 150, a first perceived distance 154 for a position change of the first object 112 may be less than a second perceived distance 156 for a position change of the second object 114; which may be less than the offset distance 152 (e.g., relatively equivalent to the particular distance 110 between the first observational position 106 and the second observational position 108). That is, for example, the observer may move laterally, comprising an observational distance (e.g., 110 and/or 152), while foreground objects, such as the utility pole 114, may move the second distance 156, between the first and second images 102, 104, which is less than the observational distance, and background objects, such as the building 112, may move the first distance 154, which is less than the second distance 156. In this way, as an example, while moving laterally, observed foreground objects may appear to move faster than observed background objects, which is a result of parallax.

As provided herein, a method may be devised that provides for generating imagery, such as lateral panoramas (e.g., human-scale, street-level, panoramic images), that accounts for parallax. Various distances between observational positions from which images are acquired, and various perceived locations of objects within the images may be used to identify a relative layering (e.g., foreground, midground, and/or background object layers) for image data comprising the images. Objects having respective depths substantially corresponding to a first depth may be used to identify a first layer, objects having respective depths substantially corresponding to a second depth may be used to identify a second layer, etc. When panning along resulting imagery, the layers may be moved at different speeds to compensate for parallax, for example, thus effectively making use of parallax when a user interacts with the resulting imagery to afford a more natural, realistic, etc. experience.

Figure 2:
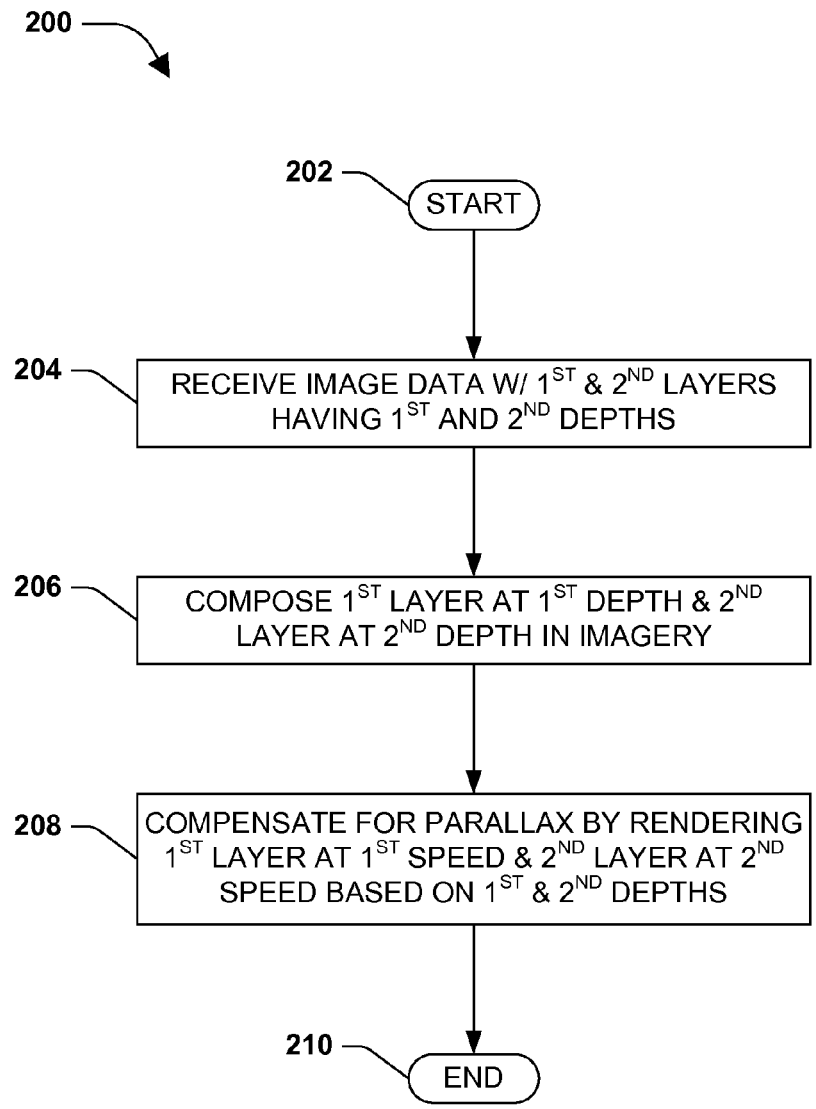
FIG. 2 is a flow diagram illustrating an exemplary method for rendering imagery that compensates for parallax.

FIG. 2 is a flow diagram illustrating an exemplary method 200 for rendering imagery that compensates for parallax. The exemplary method 200 begins at 202. At 204, image data is received, where the image data comprises a first layer, comprising an associated first depth, and a second layer, comprising an associated second depth. As one example, the image data may comprise a plurality of images or frames of image content (e.g., comprising photographs or video), where the image data represents consecutive images that may have been collected along short intervals (e.g., an image collected every three meters), showing street-level imagery (e.g., along one side of a street).

Further, in one embodiment, two or more image layers may have been identified in the image data, along with an image layer depth for the respective image layers. As an example, a street-level image of one side of a street may comprise objects in the foreground (e.g., cars, people, utilities, and/or landscaping, etc.), objects in the mid-ground (e.g., building fronts, business signs, and/or more landscaping, etc.) and objects in the background (e.g., hills and/or clouds in the sky, etc.). In this example, the image data may comprise three layers, comprising the foreground, mid-ground and background, where respective layers are associated with a depth, comprising a relative distance from the layer to a point of observation.

At 206 in the exemplary method 200, the first layer is composed at the first depth in resulting imagery and the second layer is composed at the second depth in the resulting imagery. As one example, portions of an image that comprise objects identified at the first depth (e.g., within a first depth range) can be composed together as first layer image data (e.g., comprising an image of the first layer); and portions of the image that comprise objects identified at the second depth (e.g., within a second depth range) can be composed together as second layer image data (e.g., comprising an image of the second layer). Further, as an example, the first layer and second layer image data may be combined, resulting in imagery comprising the first layer at the first depth (e.g., at the foreground of the imagery) and the second layer at the second depth (e.g., in the background, behind the first layer, in the imagery).

In one embodiment, at least one of the first layer and the second layer (e.g., and a third layer, fourth layer, etc.) may comprise an object tag layer, where the object tag layer can comprise information that may be associated with an object identified in the image data. As an example, an object tag may comprise metadata related to an object (e.g., and/or geo-location) in the image, such as an entity name (e.g., business, public transport station, street, point-of-interest, etc.), information about an entity (e.g., hours of operation, bus schedule, address, contact information, descriptive information, reviews, web-address, etc.), network feed updates related to an entity and/or geo-location (e.g., social network feed, micro-blog feed, news feed, etc.), and/or media associated with an entity or geo-location (e.g., images, video, audio, live media feeds, etc.).

In one embodiment, geo-location data for an identified object can be received from one or more online sources, for example, and combined in one or more of the layers. As an example, information about a geo-location associated with an object (e.g., a social status update indicating a user was recently at a location) in the image data can be received from the Internet (e.g., by crawling the Internet for data that is linked to the object and/or geo-location). In one embodiment, the information associated with the object can be annotated to the object in the object tag layer, which can be composed in the resulting imagery. Further, in one embodiment, more than one object tag layer may be composed in the resulting imagery. For example, foreground object tags may be annotated to objects in the foreground, mid-ground object tags may be annotated to objects in the mid-ground, and/or background object tags may be annotated to objects in the background. In this manner, hours of operation may appear to hover a foreground business sign object, a meal special advertisement may appear to hover over a mid-ground restaurant object, and weather information may appear to hover over a background ski slope object, for example.

At 208 in the exemplary method 200, the resulting imagery can be rendered to compensate for parallax. The first layer is rendered at a first movement speed and the second layer is rendered at a second movement speed, where the first movement speed and the second movement speed are based at least upon the first depth and the second depth from the image data. As one example, the first depth may comprise a shorter distance to an observational point (e.g., 106 of FIG. 1A) than the second depth. In this example, the second movement speed may be slower than the first movement speed, as the second layer comprises objects (e.g., 112 of FIGS. 1A and 1B) that are further away from the observational point than objects (e.g., 114 of FIGS. 1A and 1B) comprised in the first layer.

As one example, the rendering of different layers at different respective speeds can provide a user experience where parallax is used to enhance spatial awareness when viewing a lateral panorama. That is, for example, a lateral panorama may comprise an image that is comprised of a plurality of relatively consecutive images, stitched together to form the panorama that compensates for parallax. In this example, by panning a foreground layer at a faster speed than a background layer, the user's viewing experience, while panning the image, may feel more like viewing the imagery from a street-level, human-scale, while parallax is naturally being experienced.

Further, as one example, one or more object tag layers may be composed in the resulting imagery, where a composite image may comprise object tags that use parallax to provide an enhanced viewing experience. As one example, an object tag (e.g., a metadata overlay, such as a POI, portal, lens, etc.) can be layered in the composite image to be able to participate in the image. When the composite image is viewed and/or panned by the user, the object tags may be subject to similar rules of parallax as the one or more layers comprising objects (e.g., buildings, etc.). That is, for example, a POI bubble may be rendered in a first layer in front of a business comprised in a second layer. In this example, the first layer, comprising the bubble, can be 'moved' at a faster speed (e.g., upon user panning) than the second layer, comprising the business; thereby using parallax to create a spatial user experience where the bubble appears to be floating in front of the building, and moving at a different rate than the building during panning. Having rendered the resulting imagery, the exemplary method 200 ends at 210.

Figure 3:
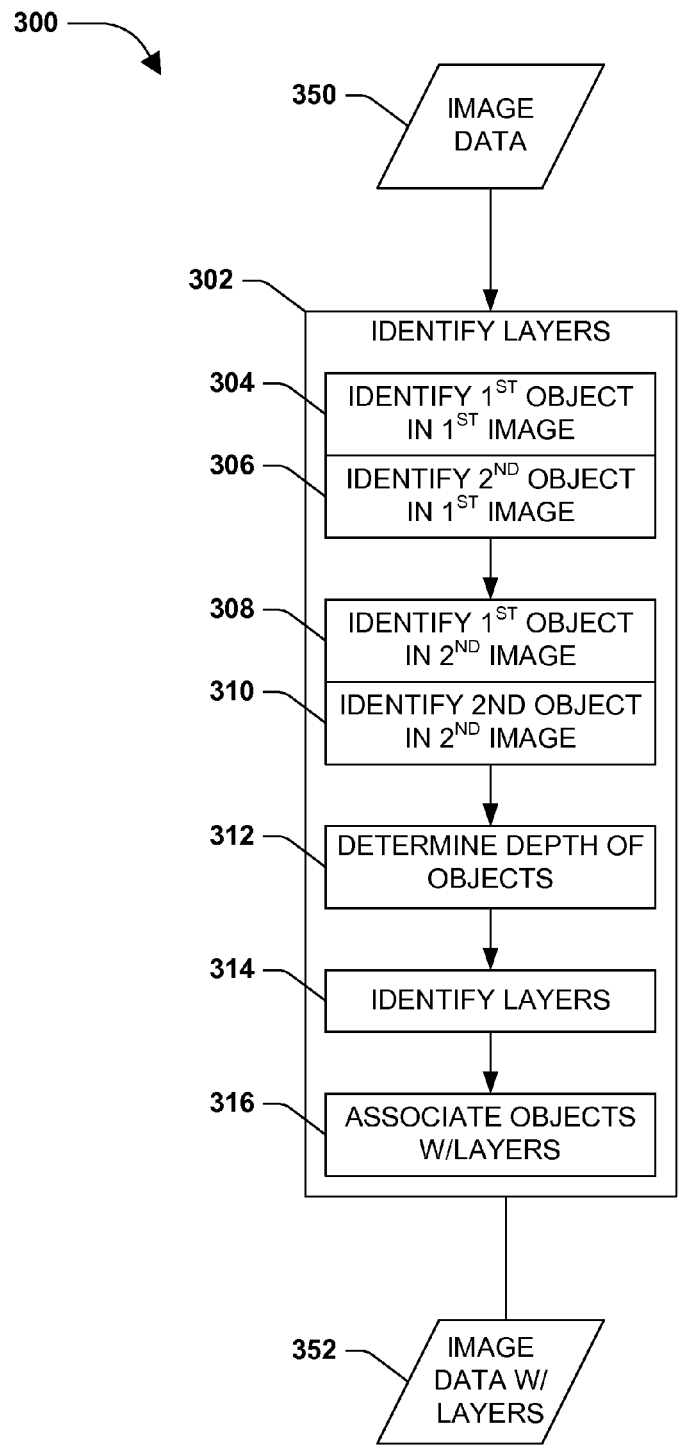
FIG. 3 is a flow diagram illustrating an example embodiment where one or more portions of one or more one or more techniques described herein may be implemented.

FIG. 3 is a flow diagram illustrating an example embodiment 300 where one or more portions of one or more one or more techniques described herein may be implemented. At 302, identifying layers in image data 350 can comprise identifying a first object in a first image, at 304, and identifying a second object in the first image, at 306. Further, at 308, the first object can be identified in a second image, and the second object can be identified in the second image, at 310.

In one embodiment, identifying one or more layers can comprise identifying a depth of various objects in the image data, from an observational point (e.g., 106, 108 of FIG. 1A). One way to determine the depth of an object, for example, may be to view the same object from two different perspectives (e.g., much like animals, such as people, do with stereoscopic vision). Therefore, in one embodiment, the first identified object can be identified in two different images of the image data (e.g., relatively consecutive images, collected of a lateral view of a location, such as a street); and the second identified object can also be identified in two different images (e.g., the same images as used for the first object) of the image data.

At 312, a first depth for the first object can be determined, and a second depth for the second object can be determined (e.g., and a third depth for a third object, and fourth depth for a fourth object, and so-on). As one example, the first depth may be determined by viewing the first object from at least two different perspectives (e.g., two or more relatively consecutive images), and the second depth may be determined by viewing the second object from at least two different perspectives. In this example, as described above, there can be a perceived change in position and/or direction of the observed object resulting from the change in an observer position relative to the object (e.g., the observational point for the respective images). When the observer changes their observational position the line of sight to the object is also changed, which may be used to identify the depth of the object, for example.

At 314, two or more layers may be identified for the image data, such as a foreground and a background (e.g., or a foreground, mid-ground and background, or more). Further, at 316, the identified objects can be associated with at least one of the identified layers, based at least upon the object depth for the respective objects. As one example, a layer identified in the image data may comprise objects within a desired depth range. For example, objects identified as comprising a depth between zero and zero plus X, from an observational point (e.g., where X is a desired depth for a first layer), may be associated with a first layer (e.g., closest to a point of observation for an image). Further, in this example, objects identified as comprising a depth between zero plus X and zero plus Y, for the observational point (e.g., where Y is a desired depth for a second layer), may be associated with a second layer, and so-on.

In the example embodiment 300, identifying the layers in image data 350 can result in image data comprising identified layer data. As an example, the image data 350 may comprise a plurality of relatively consecutive images (comprising objects) respectively collected from observational points along a location, such as a street, road or highway. For example, the image data may comprise human-scale images that depict street-level imagery along one side (or both sides) of a street (e.g., collected at desired intervals (e.g., distances) along the street). The resulting image data 352 can further comprise the layer data that identifies the two or more layers, and identifies with which layer the respective identified objects may be associated (e.g., object 1, layer 1; object 2, layer 2; object 3, layer 2; object 4, layer 1; etc.).

Figure 4:
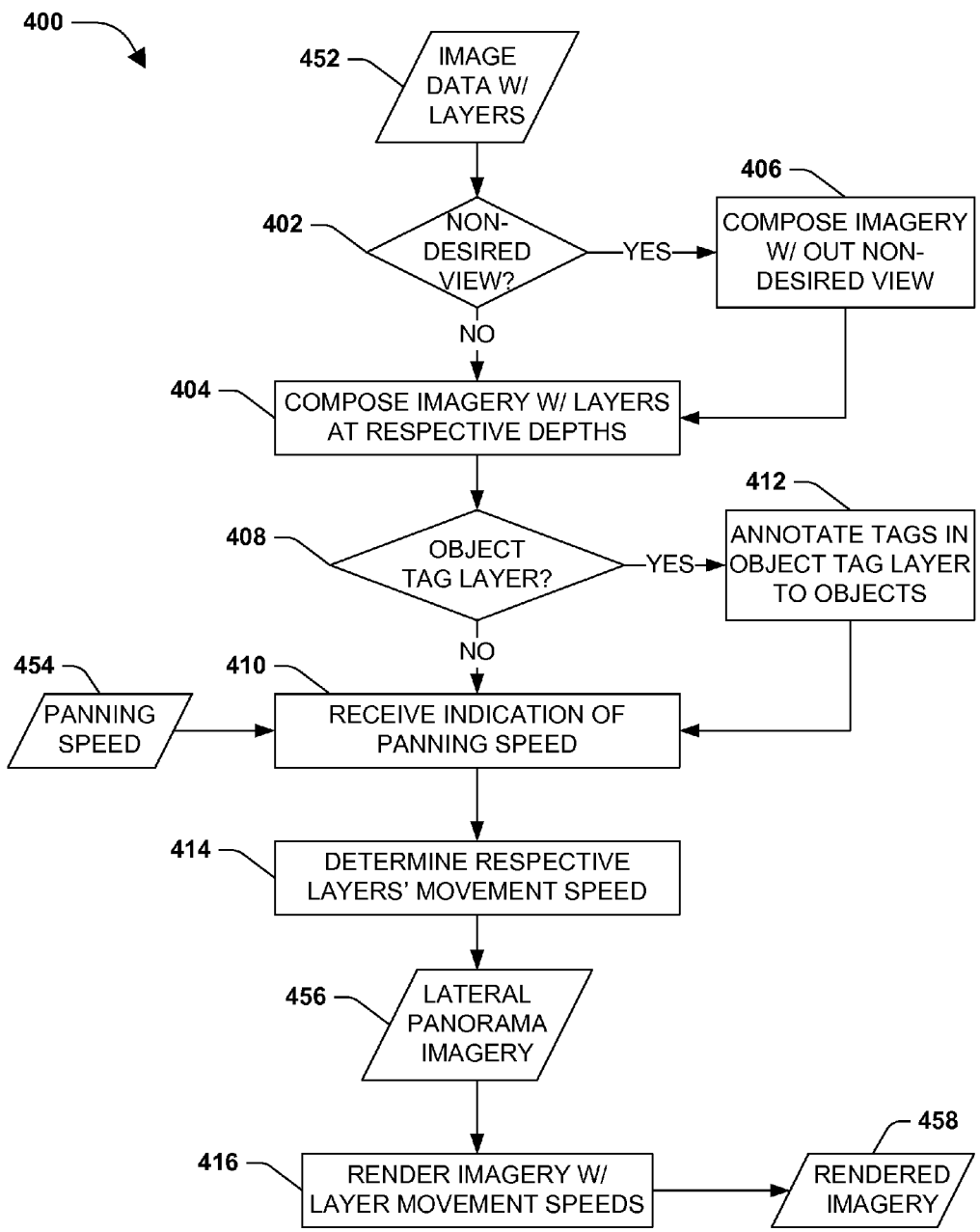
FIG. 4 is a flow diagram illustrating an example embodiment where one or more portions of one or more one or more techniques described herein may be implemented.

FIG. 4 is a flow diagram illustrating an example embodiment 400 where one or more portions of one or more techniques described herein may be implemented. In one aspect, imagery, such as planar panorama imagery, may comprise non-desired views of objects. As an example, when images, comprised in image data, are stitched together to form the planar panorama, a compressed object (e.g., cut-off), obscured object (e.g., a desired object obscured by a non-desired object), duplicate object, and/or unwanted object (e.g., distracting and/or unneeded) may be included in the resulting imagery. In one embodiment, the non-desired views may be identified and mitigated in resulting imagery.

At 402 in the example embodiment 400, a non-desired view of an object (e.g., one or more non-desired views of one or more non-desired objects) can be identified, if present, in the image data 452 (e.g., the image data comprising the layer data, such as 352 of FIG. 3). If the non-desired view of the object is identified (YES at 402), the imagery (e.g., the image data w/layers 452) can be composed without the non-desired view, at 406. As one example, two of more consecutive image frames of a location, comprising the image data, may comprise relatively the same objects. However, in this example, the consecutive frames may comprise different views, such that a first frame comprises a desired view, and a second frame comprises a non-desired view. In this example, the resulting imagery may be composed using the first frame but not the second frame. In another example, a non-desired object may be removed (e.g., erased, cut-out, drawn over, filled-in, etc.) from the frame comprising the non-desired view, such that the resulting imagery does not comprise the non-desired object.

If the image data 452 does not comprise a non-desired view of the object (NO at 402) (e.g., and/or after removing the non-desired view at 406), the respective layers identified in the image data 452 can be composed in resulting imagery, according to their associated depths, at 404. As one example, a first layer, such as a foreground layer comprising foreground objects, can be composed at a foreground of the resulting imagery, a second layer, such as a mid-ground layer comprising mid-ground objects, can be composed behind the first layer in the resulting imagery, and a third layer, such as a background layer comprising background objects, can be composed behind the second layer in the resulting imagery.

In one embodiment, received image data 452 may comprise an object tag layer, where the object tag layer comprises information that can be associated with an object identified in the image data. As one example, an object in the image data 452 may comprise a building, business, point of interest, geo-location, street, etc. In this example, one or more objects may respectively be associated with information, such as a business name, hours of operation, descriptive information, location name, updates from a social network, ratings, media, and much more.

At 412, if the image data 452 comprises an object tag layer (YES at 408), a tag in the object tag layer can be annotated to respective objects associated with the information in the tag. In one embodiment, the object tag layer, comprising the tags annotated to the object, for example, can be composed at a third depth in the resulting imagery. In one embodiment, the object tag layer may be composed in the resulting imagery, such that the object tag layer comprises the respective tags for objects in the resulting imagery.

In another embodiment, a layer that comprises object imagery may be associated with an object tag layer. As an example, in this embodiment, a first object image layer may be associated with a first object tag layer, a second object image layer may be associated with a second object tag layer, and/or a third object image layer may be associated with a third object tag layer, and so-on. In this way, for example, respective objects in the respective layers can be annotated with a tag that comprises information associated with the tag.

Figure 5:
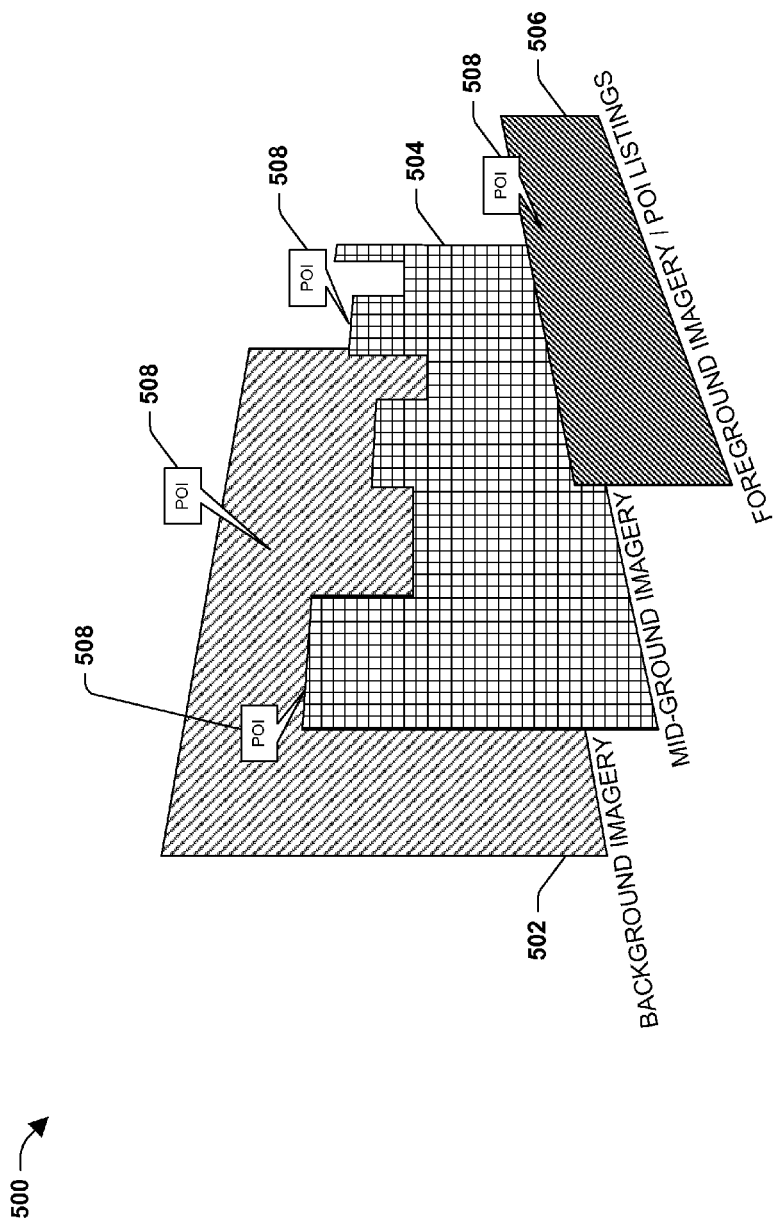
FIG. 5 illustrates an example embodiment where one or more portions of one or more one or more techniques described herein may be implemented.

As an illustrative example, FIG. 5 illustrates and example embodiment 500 where one or more portions of one or more techniques described herein may be implemented. In this example embodiment 500, three layers 502, 504, 506 are composed in resulting imagery. A first layer 506 comprises foreground imagery, such as objects that may be observed in the foreground of a street location (e.g., cars, people, utilities, sidewalk, etc.). A second layer 504 comprises mid-ground imagery, such as objects that may be observed behind the foreground imagery (e.g., buildings, business signs, entrances to buildings, etc.). A third layer 502 comprises background imagery, such as object that may be observed at a distance, behind the mid-ground imagery (e.g., scenery, sky, distant buildings, etc.).

Further, in this example embodiment 500, respective layers 502, 504, 506 may comprise tags 508 that indicate a point-of-interest (POI), portal, lens, other metadata overlay, etc. As an example, a POI tag 508 for the background layer 502 may indicate a distant object (e.g., out of site), such a city name in the distance, an historic site, a building name, etc. As another example, a POI tag 508 for the mid-ground layer 504 may indicate an object seen in the imagery, such as a business name, a descriptor for a location (e.g., type of business, hours of operation, etc.), etc. As another example, a POI tag 508 for the foreground layer 506 may indicate an object in the foreground (e.g., a bus-stop with a schedule, an intersecting street name, etc.) and/or updated information for a geo-location (e.g., online social network update for the location).

In one embodiment, the first layer (e.g., or one of the other layers) may comprise an object tag layer that comprises one or more POI listings for a geo-location (e.g., at or near a geo-location). As an example, a geo-location (e.g., comprising an area associated with the imagery, such as a mall, a park, etc.) may comprise one or more POIs. In this example, a list of the POIs may be indicated in a tag in the object tag layer (e.g., 506) for respective geo-locations in the imagery. In another embodiment, a tag 508 may be annotated to the respective POIs in the imagery, in the respective layers. As an example, respective layers 502, 504, 506 may be associated with an object tag layer that comprises one or more tags for the associated layer. Also, more than one tag layer may be associated with a layer such that characteristics, functionality, behavior, etc. of a tag may be independent of other tags (.e.g., so that a tag can individually track to an associated object (e.g., change color or otherwise when an associated object is hovered over, clicked on, etc.))

Returning to FIG. 4, at 410, an indication of a panning speed 454 can be received. As one example, a user may view the resulting imagery, such as on a screen attached to a computing device, where the resulting imagery comprises a planar panorama of a street-level location. In this example, the user may pan the imagery (e.g., to the left, right, up and/or down) by inputting a panning command (e.g., using a mouse, using a swiping motion on a touch screen, etc.). Further, in this example, the panning input can comprise a desired panning speed 454 (e.g., how fast the imagery is panned by the user).

At 414, a movement speed for the respective layers in the resulting imagery can be determined. In one embodiment, a first movement speed can be determined for a first layer, and a second movement speed can be determined for a second layer (e.g., and a third movement speed for a third layer, and so-on), based at least upon the received panning speed 454.

As an illustrative example, in FIG. 5, the first layer 506 may have a first movement speed that is higher than a second movement speed for the second layer 504, and the third layer 503 may have a slower movement speed than the second movement speed. As one example, due to parallax (as described above), objects in the foreground may appear to move faster than objects in the background (e.g., and/or mid-ground) when moving laterally.

In one embodiment, the movement speed for a layer composed in the resulting imagery can be based upon a depth of the object (e.g., from an observational point) and the panning speed (e.g., 454 of FIG. 4). That is, for example, the panning speed may be applied uniformly to respective layers (e.g., a same panning speed is used for determining respective layer movement speeds), and different depth variables may be used for the respective layers, when determining the movement speed for a layer. In this way, for example, the deeper a layer is composed in the resulting imagery, regardless of the panning speed, the slower the layer's movement speed will be in a rendered view of the image (e.g., relative to other layers in the rendered imagery).

Returning to FIG. 4, resulting lateral panorama (e.g., planar panorama) imagery 456 can comprise respective layers and associated movement speeds. In one embodiment, the resulting lateral panorama imagery 456 may comprise an object tag layer, as described above, with an associated object tag layer movement speed. In one embodiment, the object tag layer movement speed may be based, at least, upon a weighting factor.

As an example, it may be desirable to render a tag for a POI at a different movement speed than that of an associated layer, comprising an object to which the POI tag is annotated (e.g., a city name annotated to a distant background city), such that the tag and object move at different speeds in the rendered resulting imagery (e.g., because the city may be relatively large such that the tag may still "point-to" to the city with a sufficient degree of accuracy even if the tag is not moved to the same degree as the city). In this example, a weighting factor can be applied to the object tag layer, resulting in a faster (e.g., or slower) movement speed than that of the layer with which the object tag layer is associated.

At 416 in the example embodiment 400, the resulting imagery 456 can be rendered 458, where the respective layers are rendered at their associated movement speeds. As an illustrative example, in FIG. 5, the first layer 506 can be rendered in front of the second layer 504, which can be rendered in front of the third layer 503. Further, as an example, when panning, the first layer 506 can be rendered at the first movement speed; the second layer can be rendered at the second movement speed, which is slower than the first movement speed; and the third layer 502 can be rendered at the third movement speed, which is slower than the second movement speed. In this way, for example, the parallax effect can be compensated for to create and render the imagery 458 (in FIG. 4), thereby providing the user with an enhanced user experience (e.g., closer to that which may be naturally viewed at the street-level), where parallax may be used to enhance the experience.

A system may be devised that can provide a more natural viewing experience for lateral panorama imagery, using parallax, by compensating for parallax when creating the lateral panorama imagery. Two-dimensional images (e.g., photographs) may be stitched together to provide a panorama view of a location, such as for street-level imagery of a location. Parallax can provide for different viewing angles of an object, when viewing the object from a different observational location. The parallax effect can be accounted for by composing layers at different depths in resulting imagery, where the respective layers comprise objects associated with the respective depths. Further, the respective layers may be moved at different speeds, according to their depths, when the resulting imagery is panned (e.g., by a user viewing rendered imagery).

Figure 6:
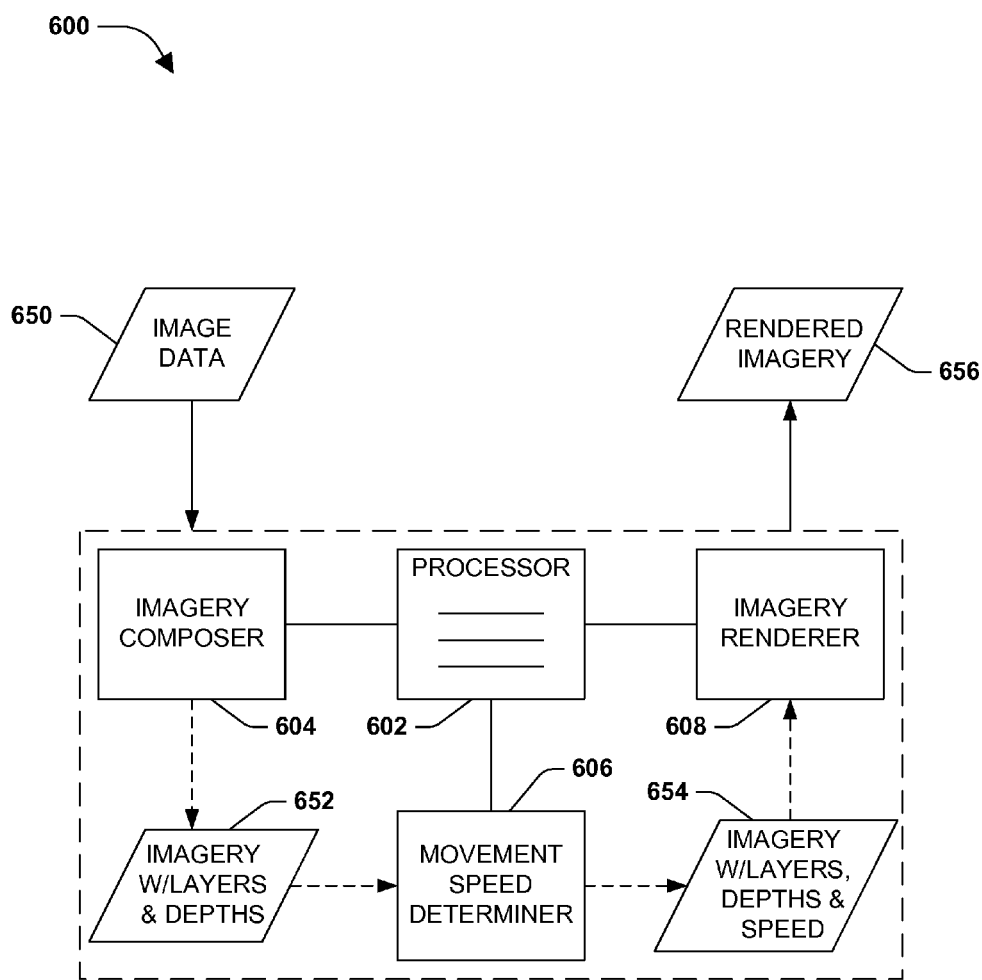
FIG. 6 is a component diagram illustrating an exemplary system for rendering imagery that compensates for parallax.

FIG. 6 is a component diagram illustrating an exemplary system 600 for rendering imagery that compensates for parallax. In the exemplary system 600, a computer-based processor 602, configured to process data for the system, is operably coupled with an imagery composing component 604. The imagery composing component 604 is configured to compose received image data 650 into resulting imagery 652, where the resulting imagery 652 comprises a first layer disposed at a first depth and comprises a second layer disposed at a second depth (e.g., and/or other layers at other depths, etc.).

In the exemplary embodiment 600, a movement speed determination component 606 is operably coupled with the processor 602. The movement speed determination component 606 is configured to determine a first movement speed for the first layer and a second movement speed for the second layer, etc. The first and second movement speeds are determined based at least upon the first depth and the second depth, for example, resulting in imagery 654 that comprises the respective layers, associated depths and associated speeds. An imagery rendering component 608 is operably coupled with the processor 602, and is configured to render the first layer in the resulting imagery 654 at the first movement speed and render the second layer in the resulting imagery 654 at the second movement speed, etc. For example, by rendering the first and second layers at different speeds (e.g., a front layer faster than a back layer) parallax is used to provide an enhanced spatial experience to a user of the imagery.

Figure 7:
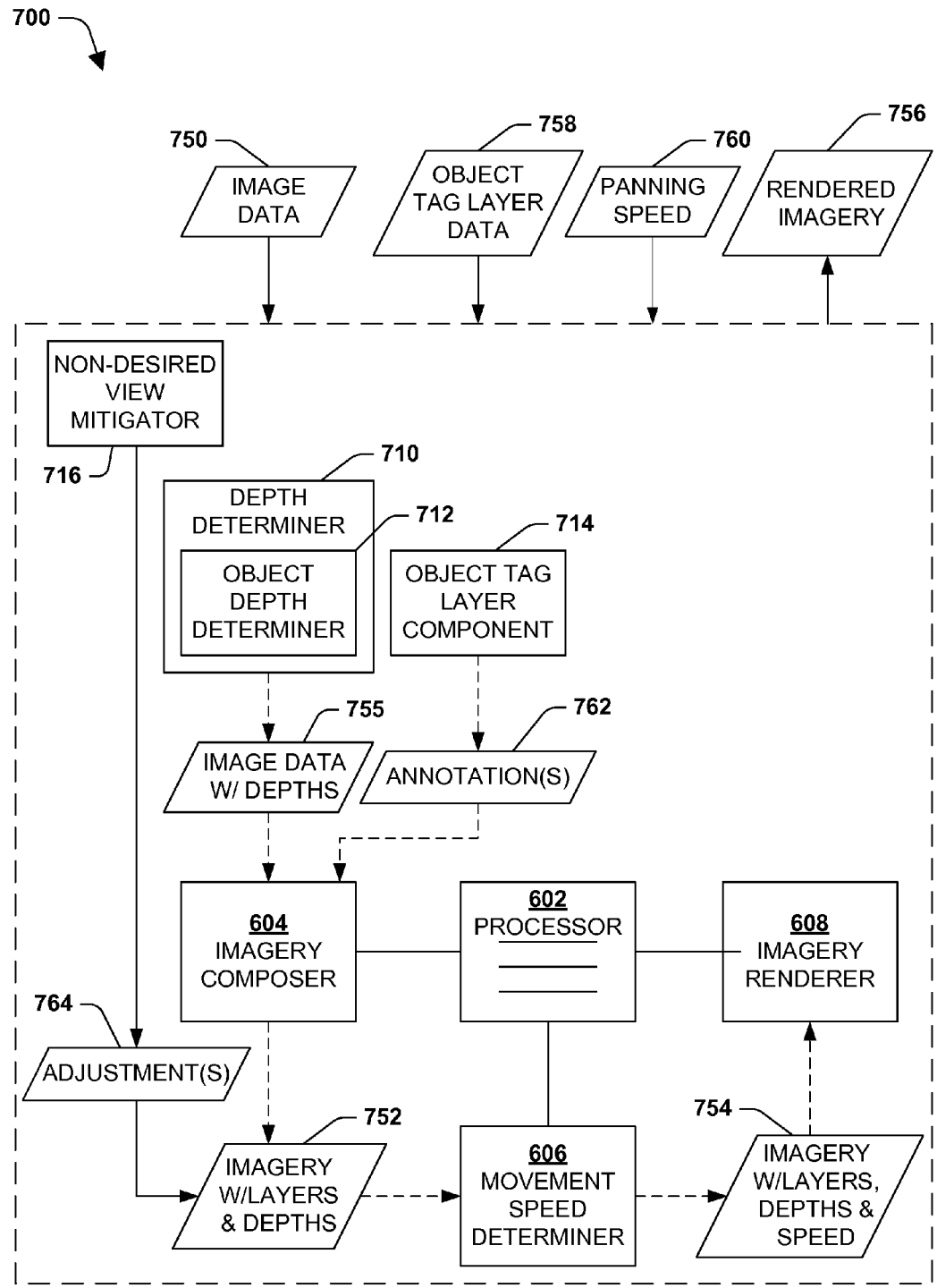
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In the example embodiment 700, a depth determination component 710 can be configured to determine the first depth and/or the second depth in the image data 750 to produce image data with depths 755. Determining the depth for the first and/or second layers can be based on a first object depth for an object in the image data 750 from a first perspective in a first image, and/or a second object depth for the object in the image data 750 from a second perspective in a second image, for example.

The depth determination component 710 can comprise an object depth determination component 712, which can be configured to identify one or more objects in the image data 750. Further, the object depth determination component 712 can be configured to determine the first object depth and/or the second object depth. The first object depth and/or the second object depth can comprise a distance between the object and an image capture location, for example.

As an example, the object depth determination component 712 can identify an object that may be disposed in two or more relatively consecutive images, from a sequence of images in the image data 750. In this example, the object depth determination component 712 can identify a distance between the object and a point of observation. As an example, a first image may comprise a first view of the object along a first line of site from a first point of observation, and a second image may comprise second view of the object along a second line of site from a second point of observation. In this example, a change in angle between the first and second lines of site to the object and a neighboring object can be used to identify the distance to the object, when the distance between the first point of observation and the second point of observation is known (e.g., between the point of image capture for the first image and the point of image capture for the second image).

As another example, the first object depth and/or the second object depth may be identified by metadata comprised in the image data. As one example, a Light Detection and Ranging (LIDAR) type device may be utilized with the image capture device used to capture images of the location. In this example, the LIDAR can collect distance metadata for objects captured by the imaging device during image capture, and the distance metadata may be comprised in the received image data. In this way, for example, the distance to identified objects may be provided by the distance metadata.

In the example embodiment 700, an object tag layer component 714 can be configured to identify an object tag layer for the image data 750. In one embodiment, the object tag layer component 714 can receive object tag layer data 758, where the object tag layer data 758 may comprise information associated with an object in the image data. Further, the object tag layer component 714 can annotate 762 at least a portion of the information associated with the object to the object in the resulting imagery 752. As one example, an object tag layer may be composed in the resulting imagery 756, where the object tag layer can use parallax to provide an enhanced viewing experience. For example, the object tag (e.g., a metadata overlay, such as a POI, portal, lens, etc.) can be layered (e.g., first) in the resulting imagery 756, and when the user pans the image, the object tag layer may appear to experience parallax by moving at a different panning speed than an object in the image. That is, for example, a object tag may be rendered in a first layer in front of a building comprised in a second layer. In this example, the first layer, comprising the object tag, can be rendered at a faster speed than the second layer, comprising the building; thereby using parallax to create a spatial user experience where the object tag appears to be in front of the building.

In one embodiment, the information associated with an object can comprise geo-location data that identifies a location of the object (e.g., a location name, an address, a coordinate, etc.). Further, the information associated with an object can comprise identification data that identifies the object (e.g., POI name, business name, etc.). Additionally, the information associated with an object can comprise descriptor information that provides information about the object (e.g., information about a POI, online user updates, etc.).

In one embodiment, the movement speed determination component 606 can be configured to determine the first movement speed and the second movement speed based at least upon a received indication of a panning speed 760 for the resulting imagery 754. In one embodiment, the movement speed determination component 606 can be configured to determine a third movement speed for the object tag layer based at least upon a third depth associated with the object tag layer, for example, and based upon the received indication of the panning speed 760.

In the example, 700, a non-desired view mitigating component 716 can be configured to mitigate a non-desired view of an object in the image data 750.

In one embodiment, the non-desired view mitigating component 716 can identify the non-desired view of the object in the image data 750, such as a non-desired object obscuring a desired object in the imagery. Further, the non-desired view mitigating component 716 can apply one or more adjustments 764 (e.g., object removal, image frame removal, etc.) to the resulting imagery 752 to mitigate the non-desired view of the object, based at least upon the first depth and the second depth.

Figure 8:
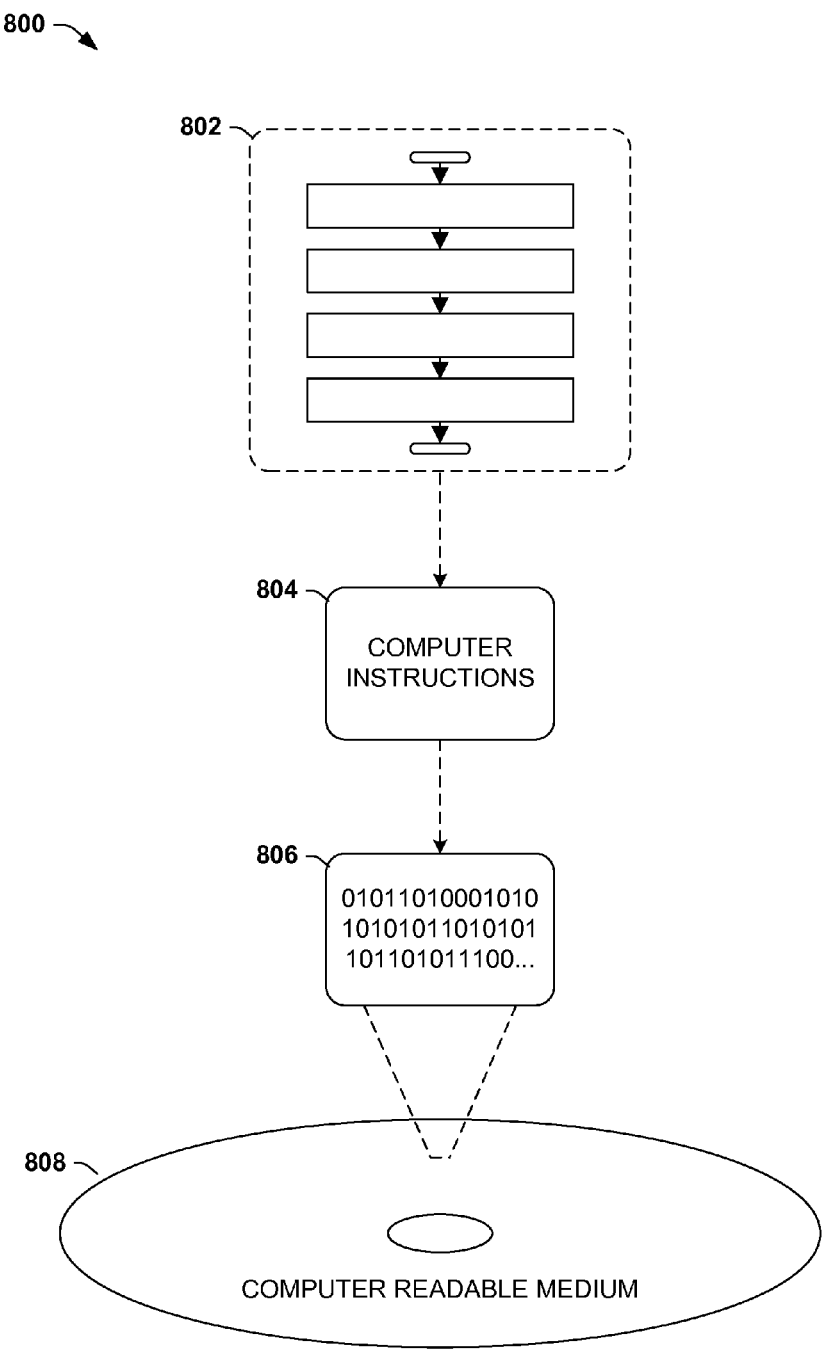
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 200 of FIG. 2, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
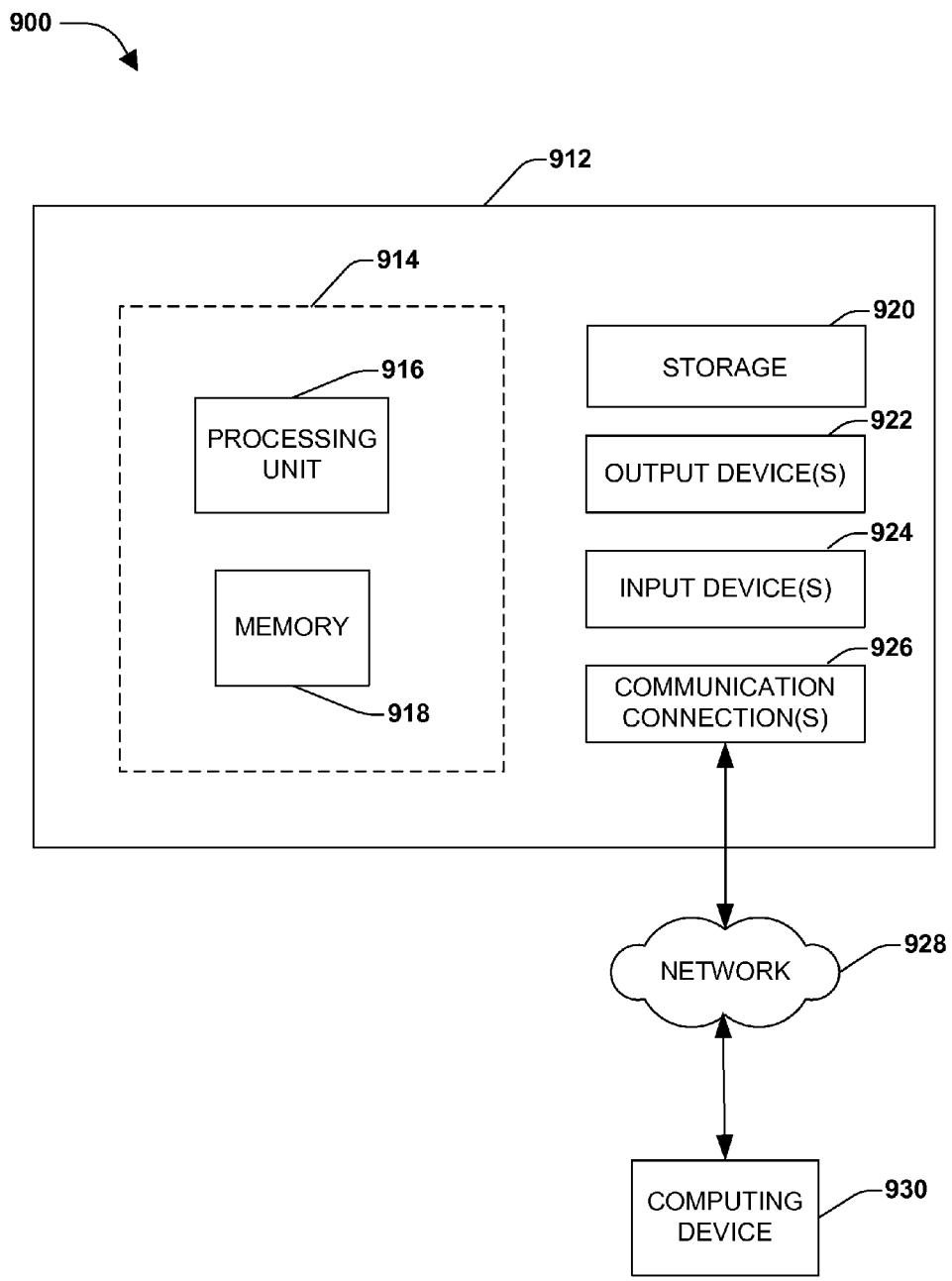
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for rendering imagery that utilizes parallax, comprising:
   receiving image data comprising a first image captured from a first observational position and a second image captured from a second observational position different than the first observational position, wherein the first and second image each include a first object and a second object and the first and second images are captured by one or more cameras;
   identifying the first object and the second object in the first image;
   determining a first location of the first object in the first image and a second location of the second object in the first image;
   identifying the first object and the second object in the second image;
   determining a third location of the first object in the second image and a fourth location of the second object in the second image;
   determining a first depth of the first object based at least upon the first location and the third location;
   determining a second depth of the second object based at least upon the second location and the fourth location, the second depth different than the first depth;
   composing a first layer for objects within a first depth range;
   composing a second layer for objects within a second depth range;
   associating the first object with a first layer based at least upon the determined first depth being within the first depth range for the first layer;
   associating the second object with a second layer based at least upon the determined second depth being within the second depth range for the second layer; and
   rendering resulting imagery to compensate for parallax by rendering the first layer at a first movement speed and the second layer at a second movement speed, the second movement speed different than the first movement speed.

2. The method of claim 1, the resulting imagery comprising a lateral panorama.

3. The method of claim 1, the rendering based at least upon a received indication to pan the resulting imagery.

4. The method of claim 1, the first layer comprising an object tag comprising information associated with the first object, and wherein the object tag is rendered at the first movement speed such that the object tag remains in a same relative position to the first object.

5. The method of claim 4, further comprising annotating the information to the first object in the resulting imagery.

6. The method of claim 1, the first layer comprising a foreground and the second layer comprising a background.

7. The method of claim 1:
   receiving image data comprising an object tag layer, the object tag layer comprising information associated with an object identified in the image data;
   composing the object tag layer at a third depth in the resulting imagery; and
   rendering the resulting imagery comprising rendering the object tag layer at a third movement speed, the third movement speed based at least upon the third depth.

8. The method of claim 7, the third movement speed based at least upon an object weighting factor.

9. The method of claim 1, comprising:
   receiving an indication of a panning speed for the resulting imagery; and
   determining the first movement speed and the second movement speed based at least upon the panning speed.

10. The method of claim 1, comprising:
    identifying a non-desired view of an object in the image data; and
    composing the resulting imagery to mitigate the non-desired view of the object based at least upon the first depth and the second depth.

11. The method of claim 1, wherein the first layer is a foreground imagery layer including a plurality of objects having varying depths within the first range and the second layer is a background imagery layer including a plurality of objects having varying depths within the second range;
    wherein rendering the first layer at the first movement speed causes all objects within the first layer to be rendered as moving at the first movement speed; and
    wherein rendering the second layer at the second movement speed causes all objects within the second layer to be rendered as moving at the second first movement speed.

12. A system for rendering imagery that utilizes parallax, comprising:
    one or more processing units; and
    memory comprising instructions that when executed by at least one of the one or more processing units perform operations comprising:
       receiving image data comprising a first image captured from a first observational position and a second image captured from a second observational position different than the first observational position, wherein the first and second image each include a first object and a second object and the first and second images are captured by one or more cameras;
       identifying the first object and the second object in the first image;

identifying the first object and the second object in the second image;

determining a first depth of the first object based at least upon a position of the first object in the first image and the second image;

determining a second depth of the second object based at least upon a position of the second object in the first image and the second image;

composing a first layer including objects within a first depth range;

composing a second layer including objects within a second depth range;

associating the first object with the first layer based at least upon the first depth being within the first depth range for the first layer;

associating the second object with the second layer based at least upon the second depth being within the second depth range for the second layer; and rendering the resulting imagery to compensate for parallax by rendering the first layer at a first movement speed and the second layer at a second movement speed, the second movement speed different than the first movement speed.

13. The system of claim 12, the resulting imagery comprising a lateral panorama.

14. The system of claim 12, the second image captured consecutive to the first image.

15. The system of claim 12, the operations comprising determining at least one of the first movement speed or the second movement speed based at least upon a received indication of a panning speed for the resulting imagery.

16. The system of claim 12, the operations comprising annotating an object in the resulting imagery with an object tag comprising information associated with the object.

17. The system of claim 16, the information associated with the object comprising at least one of:
geo-location data identifying a location of the object;
identification data that identifies the object; or
descriptor information that provides information about the object.

18. The system of claim 16, the operations comprising determining a third movement speed for an object tag layer comprising the object tag.

19. The system of claim 12, the operations comprising:
identifying a non-desired view of an object in the image data; and
adjusting the resulting imagery to mitigate the non-desired view of the object based at least upon the first depth and the second depth.

20. A computer readable device comprising instructions that when executed perform a method for rendering imagery that utilizes parallax, comprising:

receiving image data comprising a first image captured from a first observational position and a second image captured from a second observational position different than the first observational position, wherein the first and second image each include a first object and a second object and the first and second images are captured by one or more cameras;

identifying the first object and the second object in the first image;

determining a first line of sight angle to the first object in the first image and a second line of sight angle to the second object in the first image;

identifying the first object and the second object in the second image;

determining a third line of sight angle to the first object in the second image and a fourth line of sight angle to the second object in the second image;

determining a first depth of the first object based at least upon the first line of sight angle and the third line of sight angle;

determining a second depth of the second object based at least upon the second line of sight angle and the fourth line of sight angle, the second depth different than the first depth;

composing a first layer including objects within a first depth range;

composing a second layer including objects within a second depth range;

associating the first object with a first layer based at least upon the first depth;

associating the second object with a second layer based at least upon the second depth; and rendering the resulting imagery to compensate for parallax by rendering the first layer at a first movement speed and the second layer at a second movement speed, the second movement speed different than the first movement speed.

* * * * *